United States Patent [19]
Jaffe

[11] 4,406,075
[45] Sep. 27, 1983

[54] MARKING-PLATES

[76] Inventor: Walther Jaffe, Box 30001, 400 43 Göteborg, Sweden

[21] Appl. No.: 299,505

[22] Filed: Sep. 4, 1981

[30] Foreign Application Priority Data

Mar. 5, 1981 [SE] Sweden .................................. 81565

[51] Int. Cl.³ .......................... G09F 3/18; B32B 1/04

[52] U.S. Cl. ......................................... 40/16.4; 40/16; 428/43; 428/121; 428/136

[58] Field of Search ................. 428/43, 121, 122, 126, 428/136, 192, 131, 164, 187; 138/104; 40/2 R, 17, 18, 16.4; 283/18, 21

[56] References Cited

U.S. PATENT DOCUMENTS

| | | | |
|---|---|---|---|
| 1,685,456 | 9/1928 | Koch | 40/17 |
| 2,046,121 | 6/1936 | Hopp | 40/17 |
| 2,047,632 | 7/1936 | Hopp | 40/10 R |
| 3,401,075 | 9/1968 | Jackson | 428/122 |

*Primary Examiner*—Paul J. Thibodeau
*Attorney, Agent, or Firm*—Gipple & Hale

[57] ABSTRACT

Herein are disclosed marking plates in which opposed edges of a plate are bent toward one another to define channels opening upon a mid-part of the plate. A row of strip-parts of uniform width, each bearing a symbol, are held to the plate by having marginal edge portions slideably held in the channels. The mid-part of the plate defines a row of mounting holes parallel to the channels such that each hole has a length, and the holes are separated by this length, equal to the width of the strip-parts. Thus, for any number of strip-parts held by the channels on the plate, the row of strip-parts may be centered so that at least half of a mounting hole extends on each end of the row of strip-parts, providing a locking orifice for securing the strip-parts to the plate and the plate to tubes, hoses, cables, and other objects.

1 Claim, 6 Drawing Figures

Fig. 1
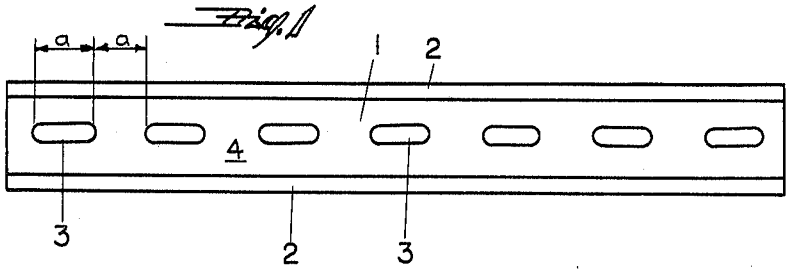
Fig. 2
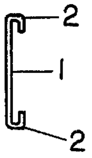
Fig. 3
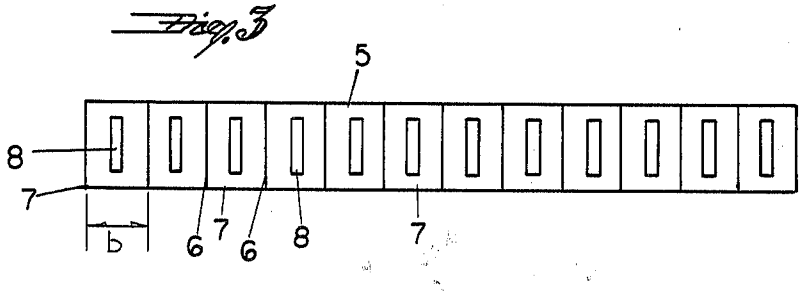
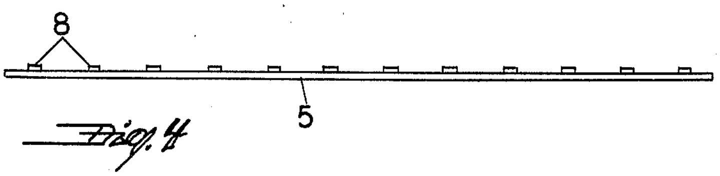
Fig. 4
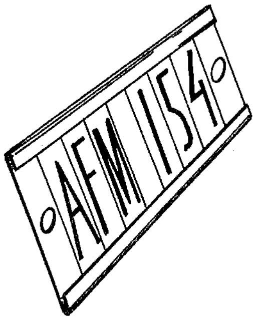
Fig. 5
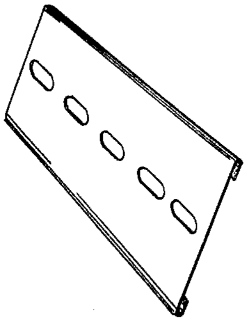
Fig. 6

MARKING-PLATES

BACKGROUND OF THE INVENTION

Existing marking-plates for marking tubes, hoses, cables and other objects are usually in the form of one single metal plate which is provided with the respective text or symbols. The user must consequently already by obtaining or ordering such marking-plates know what text or symbols etc. the respective marking-plate shall have.

SUMMARY OF THE INVENTION

This disadvantage is avoided by the present marking-plate which consists of two parts namely a profiled bar (plate) and text or symbol plates inserted in the same by the user according to his needs, so that the marking-plate will give the intended information.

The print enclosed shows one example of the present marking-plate.

BRIEF DESCRIPTION OF THE DRAWINGS

FIG. 1 shows a plan view of the profiled bar (plate) being a part of the marking-plate.

FIG. 2 shows an end view of the bar (plate) in FIG. 1.

FIG. 3 shows a plan view of a strip being a second part of the marking-plate.

FIG. 4 shows a side view of the strip in FIG. 3.

FIGS. 5 and 6 show in a somewhat bigger projection a ready marking-plate in perspective so that the front side and the rear side appear.

DESCRIPTION OF THE PREFERRED EMBODIMENT

The profiled bar (plate) 1 shown in FIG. 1 is made of metal, preferably stainless steel, and provided with bent edges 2 so that a groove is formed along each edge 2. Along the mid-part of the profiled bar (plate) 1 longitudinal holes 3 are placed whereby each hole 3 has a length a and every space 4 between the holes 3 has also the same length a in the longitudinal direction of the bar (plate). If the total width of the bar (plate) is 11 mm the stated length a is suitably 6 mm.

The strip 5 shown in FIGS. 3 and 4 is made of metal, preferably stainless steel and has a width adjusted so that the strip can be inserted in the profiled bar (plate) 1 under the edges 2 which then serve as guide.

Along the strip 5 weakening lines 6 are placed with an internal distance b the length of which is equal to the length a of the profiled bar (plate) 1. Each strip-part 7 between the weakening lines 6 is provided with suitably one and the same letter, numeral, symbol etc. 8, which through stamping is elevated on the strip 5. For this marking-plate a number of such strips 5 is manufactured so that each strip will get one and the same letter, numeral, symbol etc. on its strip-parts 7, but so that the strips have among themselves different letters, numerals, symbols etc.

A marking-plate can through the described manufacture be provided with e.g. "AEV 154" such as shown in FIG. 5. It is thereby provided that there are strips 5 which have each a row of the stated letters and numerals and also without these, whereby strip-parts 7 with the letters A,E,V, and the numerals 1,5,4 as well as one without these symbols are broken off from each of these strips in the weakening lines 6 and the free strip-parts 7 are inserted in the profiled bar (plate) 1 as shown in FIG. 5.

Because the lengths a of the profiled bar (plate) and the lengths b of the strip 5 are equal in length a free hole 3 is obtained immediately outside the inserted strip-parts 7. When a means such as a screw, rivet, ribbon or the like is arranged in the said outer hole in order to fasten the marking-plate on an object, the strip-parts 7 are simultaneously locked in the profiled bar (plate) 1. The length of this bar (plate) is suitably adjusted by cutting so that the bar (plate) ends outside of the free outer holes. Independent of the number of the strip-parts 7 inserted in the profiled bar (plate) 1 it is always obtained through the stated length and placing of the holes 3 and the length between the weakening lines 6 a free hole 3 immediately outside the inserted strip-parts. Through the described manufacture a marking-plate is easily provided with the desired information.

I claim:

1. A marking-plate of metal of the type comprising a profiled bar having two opposed bent edges separated by a mid-part, each said bent edge defining a channel opening upon said mid-part, a row of strip-parts of uniform width having marginal edge portions slideably held within said channels, each said strip-parts bearing a symbol, characterized in that a plurality of mounting holes are defined on the mid-part of the profiled bar parallel to said channels such that each said hole has a length, and said holes are spaced apart by said length equal to the uniform width of the said strip-parts and that the profiled bar has at each end of said row of strip-parts a free fastening hole immediately outside the row of the said strip-parts, and including fastening means secured through each said free fastening hole to retain said strip-parts therebetween.

* * * * *